United States Patent [19]

Frank

[11] Patent Number: 4,458,558

[45] Date of Patent: Jul. 10, 1984

[54] VARIABLE V-BELT TYPE CONTINUOUSLY VARIABLE TRANSMISSION FOR VEHICLES

[75] Inventor: Andrew A. Frank, Madison, Wis.

[73] Assignee: Aisin Seiki Kabushiki Kaisha, Kariya, Japan

[21] Appl. No.: 290,293

[22] Filed: Aug. 5, 1981

[51] Int. Cl.³ .................. F16H 37/06; F16H 37/00
[52] U.S. Cl. .......................... 74/665 GE; 74/721; 74/689; 74/745
[58] Field of Search ............ 74/689, 745, 718, 665 B, 74/665 E, 721, 665 GE

[56] References Cited

U.S. PATENT DOCUMENTS

| | | | |
|---|---|---|---|
| 2,621,545 | 12/1952 | Karig | 74/745 |
| 2,974,546 | 3/1961 | Rengert | 74/745 |
| 3,031,893 | 5/1962 | Doleschalek | 74/745 |
| 3,850,050 | 11/1974 | Lemmens | 74/689 |
| 3,924,480 | 12/1975 | Carapellucci | 74/689 |
| 4,304,150 | 12/1981 | Lupo et al. | 74/718 |

FOREIGN PATENT DOCUMENTS

| | | | |
|---|---|---|---|
| 632936 | 12/1961 | Canada | 74/689 |
| 517136 | 1/1931 | Fed. Rep. of Germany | 74/689 |
| 1286853 | 1/1962 | France | 74/689 |
| 473170 | 7/1952 | Italy | 74/689 |

OTHER PUBLICATIONS

"Advanced Gas Turbine Powertrain System Development Project", The Chrysler-Williams AGT-102, Part I—General Description & Powertrain Details by Charles E. Wagner (DOE Contract DE-AC02CS52749, Nov. 12, 1980).

*Primary Examiner*—Allan D. Herrmann
*Assistant Examiner*—D. Wright
*Attorney, Agent, or Firm*—Oblon, Fisher, Spivak, McClelland & Maier

[57] ABSTRACT

A variable V-belt type continuously variable transmission for vehicles which includes an input shaft and an output shaft, a first torque transmitting gear mechanism alternatively connectable with the input shaft and the output shaft, a countershaft connected to the first torque transmitting gear mechanism, a variable V-belt and pulley assembly, one end of which is connected to the countershaft, and a second torque transmitting gear mechanism connected to an opposite end of the variable V-belt and pulley assembly and alternatively connectable with the input shaft and the output shaft such that torque transmission from the input shaft to the output shaft occurs via a first route through the first torque transmitting gear mechanism, the countershaft, the variable V-belt and pulley assembly and the second torque transmitting gear mechanism and via a second route through the second torque transmitting gear mechanism, the variable V-belt and pulley assembly, the countershaft and the first torque transmitting gear mechanism. As an alternative, a gear mechanism can be used to substitute for the clutch members.

1 Claim, 3 Drawing Figures

VARIABLE V-BELT TYPE CONTINUOUSLY VARIABLE TRANSMISSION FOR VEHICLES

BACKGROUND OF THE INVENTION

1. Field of the Invention

This invention relates generally to continuously variable transmissions, and more particularly, to a variable V-belt type continuously variable transmission for automobiles.

2. Description of the Prior Art

In order to obtain greater fuel efficiency and to minimize the weight and cost of a conventional automatic transmission of an automobile, several attempts have been made to replace the conventional automatic transmission with a variable V-belt type continuously variable transmission (hereinafter referred to as CVT) which is lighter and less complex in structure.

However, such V-belt type CVT can obtain only 4:1 to 5:1 overall drive ratios which correspond to the belt ratios, such as, for example, the ratio of the maximum effective pitch diameter of the belt on one sheave to the minimum pitch diameter of the belt on the other sheave or vice versa.

In an automobile using the belt type CVT, however, the drive ratio should have at least a minimum ratio of 9:1 considering the fuel efficiency and engine controls. Most of the above-noted conventional CVTs have to have an auxiliary speed change gear mechanism in addition to a variable V-belt in order to obtain a wide range of drive ratios. One of the above-described attempts is shown in a DOE contract (DE-AC02-CS52749). According to this V-belt CVT, any desired range of drive ratio (up to $\infty$:1) can be obtained. However, in this attempt the belt is required to have a very high durability because of the large load exerted thereon.

SUMMARY OF THE INVENTION

It is therefore an object of the present invention to provide an improved variable V-belt type continuously variable transmission for automobiles which can obtain a wide range of drive ratios without the provision for an auxiliary speed change gear mechanism.

A further object of the present invention is to provide a variable V-belt type CVT for automobiles which obviates the above-noted conventional drawbacks.

In accordance with the present invention, a variable V-belt type continuously variable transmission for vehicles is provided which includes an input shaft and an output shaft, a first torque transmitting gear mechanism alternatively connectable with the input and output shafts, a countershaft connected to the first torque transmitting gear mechanism, a variable V-belt and pulley assembly, one end of which is connected to the countershaft, and a second torque transmitting gear mechanism pointed to an opposite end of the variable V-belt and pulley assembly and alternatively connectable with the input shaft and the output shaft such that torque transmission from the input shaft to the output shaft occurs via a first route through the first torque transmitting gear mechanism, the countershaft, the variable V-belt and pulley assembly and the second torque transmitting gear mechanism and via a second route through the second torque transmitting gear mechanism, the variable V-belt and pulley assembly, the countershaft and the first torque transmitting gear mechanism.

Alternatively, a variable V-belt type continuously variable transmission for a vehicle is provided which includes an input shaft operatively connected to the engine, an output shaft, a first gear mechanism engagable with the input shaft, a first clutch member disposed between the input shaft and the first gear mechanism for engagement of the first gear mechanism and the input shaft, a chain connected to the first gear mechanism, a countershaft connected to the chain, a variable V-belt and pulley assembly one end of which is connected to the countershaft, a second gear mechanism connected to the first gear mechanism, an intermediate shaft, one end of which is connected to an end opposite the one end of the variable V-belt and pulley assembly, a third gear mechanism carried by the intermediate shaft, a second clutch member disposed between the input shaft and an end opposite the one end of the intermediate shaft for interconnecting the intermediate shaft and the input shaft, a fourth gear mechanism connected to the third gear mechanism, a third clutch member disposed between the output shaft and the fourth gear mechanism for coupling the output shaft to the fourth gear mechanism, a fourth clutch member disposed between the second gear mechanism and the output shaft for coupling the second gear mechanism to the output shaft, a clutch control for controlling the first, second, third and fourth clutch members, and a pulley actuator control for variably changing the effective diameter of the V-belt.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
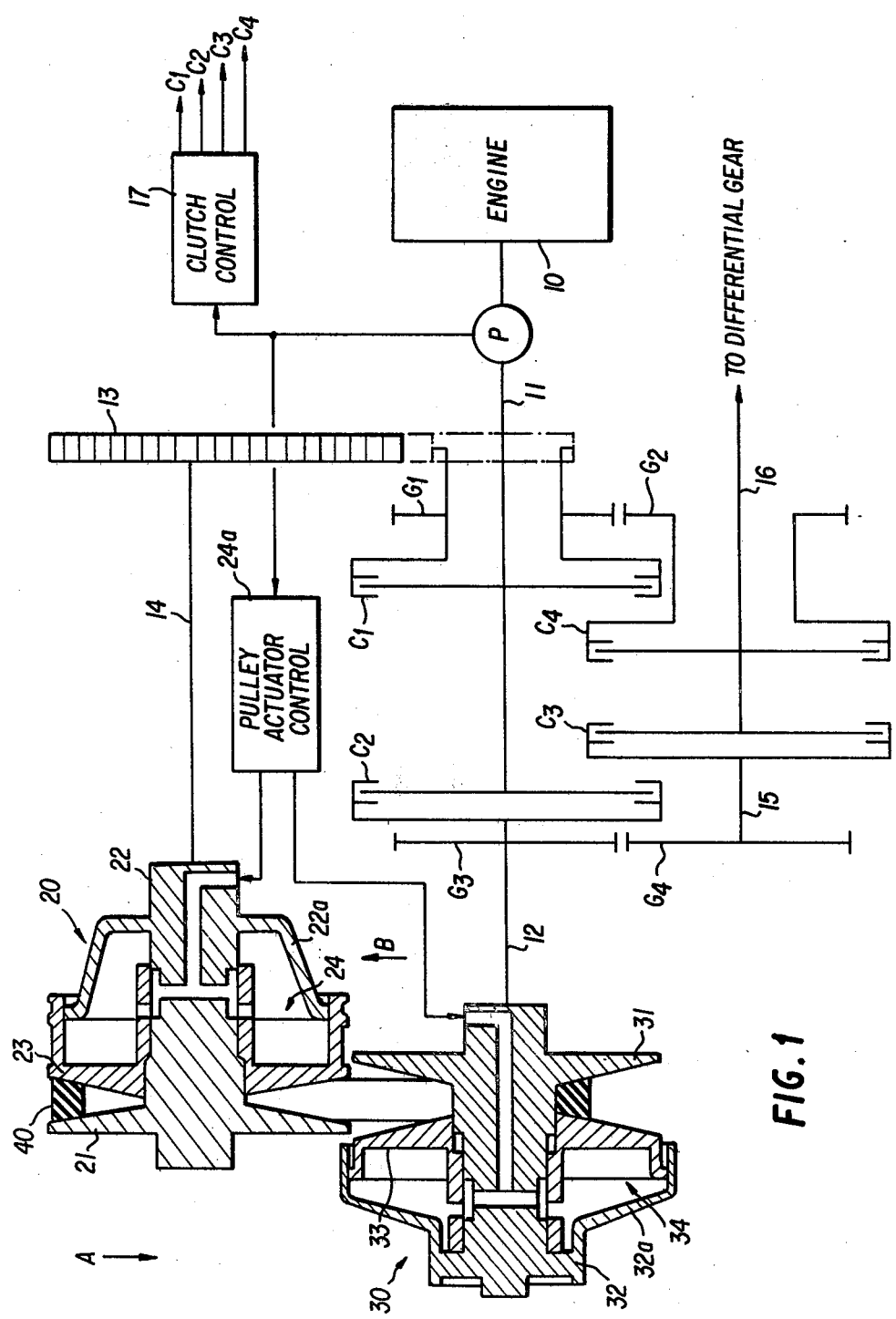
FIG. 1 shows a first embodiment of the present invention.

Referring now to a first embodiment of the present invention, numeral 10 designates an engine of an automobile which is operatively connected to an input shaft 11. First and second clutches $C_1$ and $C_2$ are provided for engaging the input shaft 11 with first gear $G_1$ and an intermediate shaft 12, respectively.

First gear $G_1$ is connected with a drive chain 13 which in turn is connected to one end of a countershaft 14. The opposite end of shaft 14 is connected to a first pulley assembly 20 which along with second pulley assembly 30 will be explained hereinafter in detail.

Intermediate shaft 12 carries a third gear $G_3$ which is geared to a fourth gear $G_4$. Fourth gear $G_4$ is connected to an intermediate countershaft 15 which is connectable with an output shaft 16 through a third clutch $C_3$ disposed therebetween. Output shaft 16 is also engageable with a second gear $G_2$ through a fourth clutch $C_4$ disposed therebetween.

Second gear $G_2$ engages with first gear $G_1$ and output shaft 16 is connected to a pair of drive wheels (not shown) through a differential gear mechanism (not shown) of the automobile.

First pulley assembly 20 includes an outer rim 21 having a hub 22 extending inwardly, an inner rim 23 which is axially slidable on hub 22 of outer rim 21 and a hydraulic chamber 24 enclosed by inner rim 23 and a flange 22a of hub extension 22. Hydraulic chamber 24 is hydraulically connected to a pulley actuater control 24a to increase or decrease the hydraulic pressure therein. Similarly, second pulley assembly 30 includes inner rim 31 having a hub 33 extending outwardly, outer rim 33 which is axially slidable on hub 32 and a hydraulic chamber 34 enclosed by outer rim 33 and a flange 32a of hub extension 32. Chamber 34 is hydraulically connected to pulley actuater control 24a to increase or decrease the hydraulic pressure therein.

Numeral 40 designates a V-belt which is disposed in both pulley assemblies 20 and 30. The effective pitch diameter of V-belt 40 is continuously variable in response to sliding movements of inner rim 23 of first pulley assembly 20 and outer rim 33 of second pulley assembly 30 for variably transmitting torque from engine 10.

The four clutches $C_1$–$C_4$ are controlled as to their coupling and decoupling operations by clutch control 17 which generally includes shift valves and modulator values (not shown). Oil pump P generates hydraulic pressure in response to engine rotation for transmitting pressure to clutch control 17 and to the pulley actuater control.

The following ratios are defined among the elements of this embodiment:

$$ic = iB\ max = 1/iB\ min \quad (1)$$

$$iG_1 = iG_2 \quad (2)$$

wherein:
 ic is the chain ratio at chain 13
 iB max is the maximum belt ratio at pulleys 20, 30
 iB min is the minimum belt ratio at pulleys 20, 30
 $iG_1$ is the gear ratio of $ZG_1/ZG_2$ wherein Z is the number of teeth
 $iG_2$ is the gear ratio of $ZG_3/ZG_4$.

When the engine is started and the transmission is shifted to the "N" range (neutral position) or the "P" range (parking position), all four clutches $C_1$–$C_4$ are in a decoupled condition. Under these operational conditions input shaft 11 is idly rotated and no torque is transmitted therefrom. When a shift lever (not shown) is shifted from the "N" or "P" range to the "D" range which covers the entire drive range from "L" (low) to "H" (high), clutch control 17 is actuated to supply pressure to first and third clutches $C_1$ and $C_3$. First clutch $C_1$ is then coupled with input shaft 11 to rotate first gear $G_1$. It should be noted at this point that third clutch $C_3$ is designed to be engaged when the pressure supplied reaches a high predetermined value that can overcome the torque at intermediate countershaft 15 which is increased through chain 13, pulleys 20 and 30, and gear $G_3$. Therefore third clutch $C_3$ at this stage is slippingly engaged with output shaft 16 functioning as a vehicle starting clutch.

Assuming that the engine starting torque is $TE_1$, first clutch $C_1$ receives and transmits the same torque from the engine to first gear $G_1$. However, third clutch $C_3$ receives and transmits torque $To_1$ to output shaft 16 according to the formula:

$$To_1 = TE_1 \times ic \times iB\ max \times iG_2 \times \eta \quad (3)$$

wherein $\eta$ designates the total mechanical efficiency of the gears, chain, etc.

When the engine r.p.m. increases third clutch $C_3$ receives additional pressure from clutch control 17 in response to the increase in engine r.p.m. and finally intermediate countershaft 15 is connected to output shaft 16 to transmit torque $To_1$ thereto discussed hereinabove.

Table 1 set forth hereinbelow shows the ratios and the numbers of rotations of the various elements when the engine r.p.m. is sampled at 2,000 r.p.m. under the abovenoted conditions as shown at $L_1$ in the Table.

TABLE 1

| | Engine rpm/ output shaft rpm | Engine rpm | $G_1$ rpm | Countershaft 14 rpm | Pulley Assembly 20 rpm | Belt 40 ratio | Pulley Assembly 30 rpm | Output Shaft 16 rpm |
|---|---|---|---|---|---|---|---|---|
| $L_1$ | 4:1 | 2000 | 2000 | 1000 | 1000 | A →  2:1 | 500 | 500 |
| $L_2$ | 2:1 | 2000 | 2000 | 1000 | 1000 | A →  1:1 | 1000 | 1000 |
| $L_3$ | 1:1 | 2000 | 2000 | 1000 | 1000 | A →  0.5:1 | 2000 | 2000 |
| $H_1$ | 1:1 | 2000 | 2000 | 1000 | 1000 | B ←  2:1 | 2000 | 2000 |
| $H_2$ | 0.5:1 | 2000 | 4000 | 2000 | 2000 | B ←  1:1 | 2000 | 4000 |
| $H_3$ | 0.25:1 | 2000 | 8000 | 4000 | 4000 | B ←  0.5:1 | 2000 | 8000 |

Under these conditions, belt ratio iB maintains its maximum level (iB max) in response to pulley actuator control 24a.

When the vehicle speed is increased, slidable rims 23, 33 are moved accordingly to change the belt ratio so as to be continuously variable. The $L_2$ range in Table 1 shows one of such transmittal conditions. At this stage the belt ratio is 1:1 and the overall CVT drive ratio is shown as 2:1. The arrow directions A and B serve to indicate direction of torque transfer between pulley assemblies 20 and 30. When the vehicle speed is further increased, pulley assemblies 20 and 30 are shifted to the position shown in FIG. 1. At this stage, the belt ratio is at its minimum (iB min) and then output shaft 16 has the same rotational rpm as the engine input and the overall CVT drive ratio is shown as being 1:1.

The output torque $To_2$ at this stage is indicated as follows:

$$To_2 = TE \times ic \times iB\ min \times iG_2 \times \eta \qquad (4)$$

Similarly the output r.p.m. $NO_2$ is indicated as follows:

$$NO_2 = NE/(ic \times iB\ min \times iG_2) \qquad (5)$$

Thereafter when the vehicle speed reaches a predetermined value which requires the transmission to be shifted to the "H" range, clutch control 17 is actuated to disengage first and third clutches $C_1$ and $C_3$ and engage second and fourth clutches $C_2$ and $C_4$.

Input shaft 11 is then connected to intermediate shaft 12 through second clutch $C_2$ and the torque from intermediate shaft 12 is transmitted through pulley assemblies 20, 30 to countershaft 14 and then through chain 13 and gears $G_1$, $G_2$ through fourth clutch $C_4$ to output shaft 16.

In order to further explain operation of the present invention, each torque transmission route is shown below:

$L_1$–$L_3$ range: Engine 10 to (clutch C1) to chain 13 to countershaft 14 to pulley 20 to pulley 30 to intermediate shaft 12 to gears $G_3$, $G_4$ to intermediate countershaft 15 to (clutch $C_3$) to output shaft 16.

$H_1$–$H_3$ range: Engine 10 to (clutch $C_2$) to intermediate shaft 12 to pulley 30 to pulley 20 to countershaft 14 to chain 13 to gears $G_1$, $G_2$ to (clutch $C_4$) to output shaft 16.

Thereafter, in response to the increase in vehicle speed, the overall CVT drive ratio changes from $H_1$ to $H_3$ in a continuously variable manner.

The drive range change from $L_3$ to $H_1$ or $H_1$ to $L_3$ is sensed in any suitable manner, such as for example, via a pulley positioning sensor (not shown) or speed governor. At the synchronizing point of the above-noted $L_3$ to $H_1$ shifting, the output torque $To_3$ and output r.p.m. $NO_3$ are defined as follows:

$$To_3 = TE \times (1/iB\ min) \times (1/ic) \times ig_1 \times \eta \qquad (6)$$

$$No_3 = NE \times iB\ min \times ic \times (1/iG_1) \qquad (7)$$

Since the relations among the elements are taken as shown by (1) and (2), the above-noted formulae (6) and (7) can be rewritten as:

$$\begin{aligned} To_3 &= TE \times ic \times 1/ic \times iG_1 \times \eta \\ &= TE \times iG_1\ \eta = To_2 \end{aligned} \qquad (8)$$

$$\begin{aligned} No_3 &= NE \times 1/ic \times ic \times 1/iG_1 \\ &= NE/iG_2 = No_2 \end{aligned} \qquad (9)$$

Thus, both output torque and output r.p.m. at the $H_1$ range are equal to that at the $L_3$ range and therefore the change from the $L_3$ to the $H_1$ stage (or vice versa) can be performed by complete synchronizing engagement, which results in smooth shifting without causing any shocks.

Assuming that the output torque and the output r.p.m. at the $H_3$ range are $To_4$ and $No_4$, such are determined as follows:

$$TO_4 = TE \times \left(\frac{1}{iB\ max}\right) \times \left(\frac{1}{ic}\right) \times iG_1 \times \eta \qquad (10)$$

$$NO_4 = NE \times iB\ max \times ic \times \left(\frac{1}{iG_1}\right) \qquad (11)$$

the overall drive ratio $TO_1/TO_4$ is therefore determined as follows:

$$TO_1/TO_4 = (iC)^2 \times (iB\ max)^2 \qquad (12)$$

Therefore, when the ic is 2:1, iB max is 2:1 as shown in Table 1, and $To_1/To_4$ equals 16:1 which is sufficient for use as a automobile transmission drive ratio and yet the overall range of the belt ratio can be designed to be only 4:1.

Figure 2:
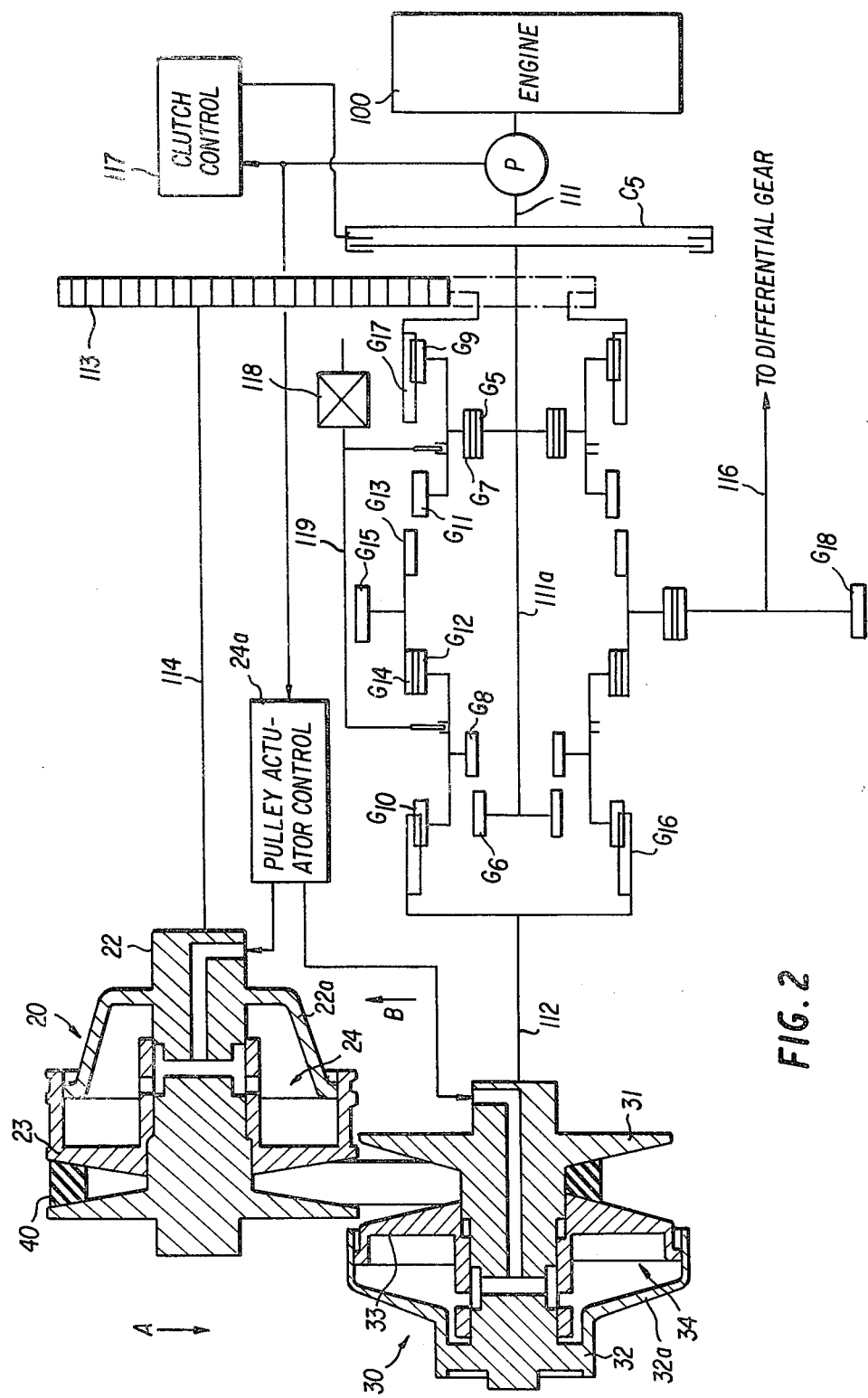
FIG. 2 shows a second embodiment of the present invention showing the drive range in a "LOW" range.
Figure 3:
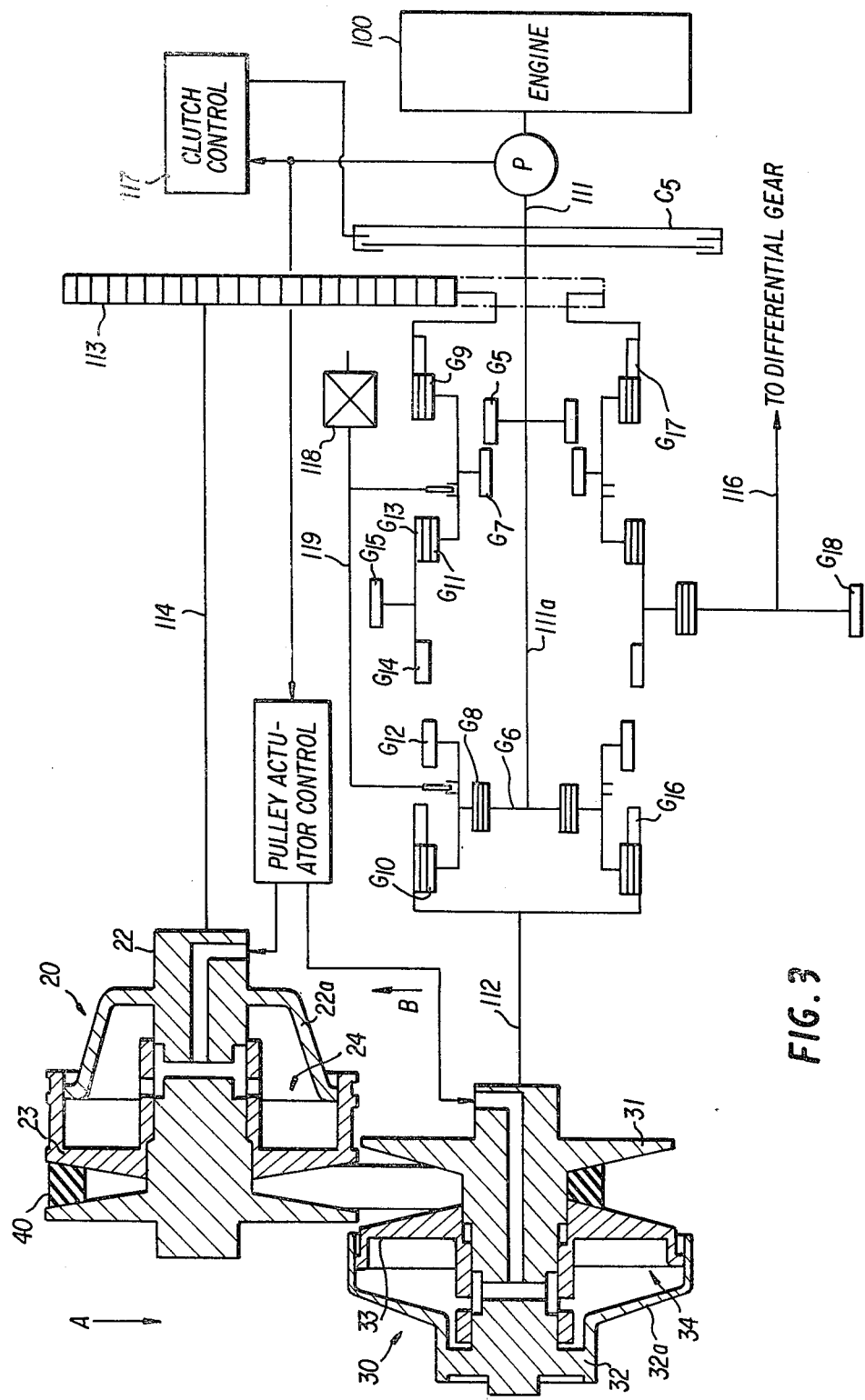
FIG. 3 is an illustration similar to FIG. 3 but which shows the drive range in a "HIGH" range.

In the above noted embodiment, various clutches have been used but as shown in FIG. 2 and FIG. 3 a gear mechanism may be used instead of clutches. Concerning the second embodiment shown in FIGS. 2 and 3, this embodiment uses a gear mechanism instead of the clutches used in the previous embodiment. More particularly, in FIG. 2, the gear mechanism is shown to be shifted to a "Low" range.

In response to a signal from sheave position sensor (not shown), solenoid valve 118 is actuated to shift a selector shaft 119 to the position shown in FIG. 2. Clutch $C_5$ between the input shaft 111 and input shaft 111a which is an extension of input shaft 111 via clutch $C_5$ functions as a vehicle starting clutch, the function of which is similar to clutch $C_3$ of the previous embodiment. In other words, when engine 100 is started and the gear mechanism is in the "Low" range shown in FIG. 2, clutch $C_5$ is slippingly engaged for starting the vehicle by connecting input shafts 111 and 111a to each other. This clutch engagement is made in accordance with the pressure supplied from clutch control 117.

When clutch $C_5$ is completely coupled, the rotational torque from input shaft 111 is transmitted to input shaft 111a, which carries spline gears $G_5$ and $G_6$. Spline gear $G_5$ is engaged with spline gear $G_7$ which, in turn, is engaged with spline gear $G_9$. The gear $G_9$ is engaged with spline gear $G_{17}$ which is connected to chain 113 to transmit torque from input shafts 111, 111a to countershaft 114. The torque at countershaft 114 is continuously variable transmitted to intermediate shaft 112 through variable belt and pulley assemblies 20, 30. Intermediate shaft 112 is connected to spline ring gear $G_{16}$ which is engaged with spline gear 10. Spline gear 10 is connected to spline gear 12 which is engaged with spline gear 14 carried by output shaft 116. Thus, torque from engine 100 is transmitted through spline gears $G_5$, $G_7$, $G_9$ and $G_{17}$, chain 113, countershaft 114, pulley assembly 20, 30, intermediate shaft 112, and spline gears $G_{16}$, $G_{10}$, $G_{12}$, $G_{14}$ and external gears $G_{15}$ and $G_{18}$ to output shaft 116.

When solenoid 118 receives a signal from the sheave position sensor for shifting to a "High" range, such is actuated to shift selector shaft 119 to the left to change the engagement conditions among the gear elements. FIG. 3 shows the changed positions of the gears, wherein the spline gear $G_5$ is disengaged from spline gear $G_7$. Instead, spline gear $G_6$ is in engagement with spline gear $G_8$ which is connected to spline gear $G_{10}$. Spline gear $G_{10}$ maintains engagement with spline gear $G_{16}$ which is connected to an intermediate shaft 112. Thus torque from the engine is transmitted from spline gears $G_6$, $G_8$, $G_{10}$ and $G_{16}$ to intermediate shaft 112. The torque at shaft 112 is further transmitted through pulley assemblies 30, 20 to countershaft 114 which is connected to chain 113. Spline gear $G_{17}$, which is connected to the chain 113, maintains engagement with spline gear $G_9$. Spline gear 11 which is connected to spline gear $G_9$ is in engagement with spline gear $G_{13}$ which is connected to external gear $G_{15}$. Gear $G_{15}$ maintains engagement with external gear 18 which is connected to output shaft 116. Thus torque from countershaft 114 is further transmitted to output shaft through chain 113 and spline gears $G_{17}$, $G_9$, $G_{11}$, $G_{13}$, and external gears $G_{15}$, $G_{18}$.

Assuming that the ratios of the elements are defined as follows:

$$ic = iBmax = 1/iB\ min \qquad (13)$$

wherein ic is chain 113 ratio
iB max is the maximum belt ratio at the pulleys
iB min is the minimum belt ratio at the pulleys
the torque $To_1$ at output shaft 116 under maximum belt ratio under "L" range can be represented as:

$$To_1 = TE_1 \times ic \times iB\ max \times iG \times \eta \qquad (14)$$

wherein $TE_1$ is the engine input torque;
iG is $G_{15}/G_{18}$; and
$\eta$ is the total mechanical efficiency of gears, chain, etc. Then, the torque $To_4$ at output shaft 116 under minimum belt ratio under "H" range can be represented as:

$$To_4 = TE_1 \times (1/iB\ max)(1/ic) \times iG \times \eta\ (15)$$

Therefore the overall drive ratio is $$\frac{To_1}{To_4} = \frac{TE_1 \times ic \times iBmax \times iG \times \eta}{TE_1 \times \left(\frac{1}{iBmax}\right) \times \frac{1}{ic} \times iG \times \eta} \qquad (16)$$

$$= (ic)^2 \times (iBmax)^2$$

Thus the overall drive ratio is the same as that obtained in the previous embodiment shown in FIG. 1. Since all the gears except gears $G_{15}$ and $G_{18}$ are in synchronizing engagement with one another, the gear ratio is considered only at point of engagement between gears $G_{15}$ and $G_{18}$.

It should be noted that a forward-reverse shift gear mechanism has been omitted from the embodiments. However, such can be easily provided for, for example, by inserting a counter gear mechanism between gears $G_3$ and $G_4$ of the first embodiment (FIG. 1). When the shift lever is shifted to "R" range (reverse), the engagement between gears $G_3$ and $G_4$ is released and, instead, the counter gear mechanism is engaged with gear $G_3$ for reversingly rotating intermediate counter shift 15. Under this "R" range, clutches $C_1$ and $C_3$ and actuated by clutch control 17.

The embodiments discussed above are shown as a transmission for vehicles but it should be noted that this invention may be adapted to a control system for industrial machines which have a function of a reduction unit.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A variable V-belt type continuously variable transmission for a vehicle having an engine comprising:
   an input shaft operatively connected to said engine;
   an output shaft;
   first gear means engageable with said input shaft;
   first clutch means disposed between said input shaft and first gear means for engagement of said first gear means and said input shaft;
   a chain connected to said first gear means;
   a countershaft connected to said chain;
   a variable V-belt and pulley assembly one end of which is connected to said countershaft;
   second gear means connected to said first gear means;
   an intermediate shaft one end of which is connected to an end opposite said one end of said variable V-belt and pulley assembly;
   third gear means carried by said intermediate shaft;
   second clutch means disposed between said input shaft and an end opposite said one end of said intermediate shaft for interconnecting said intermediate shaft and said input shaft;
   fourth gear means connected to said third gear means;
   third clutch means disposed between said output shaft and said fourth gear means for coupling said output shaft to said fourth gear means;
   fourth clutch means disposed between said second gear means and said output shaft for coupling said second gear means to said output shaft;
   clutch control means for controlling said first, second, third and fourth clutch means; and
   pulley actuator control means for variably changing the effective diameter of said V-belt.

* * * * *